United States Patent Office 3,324,379
Patented June 6, 1967

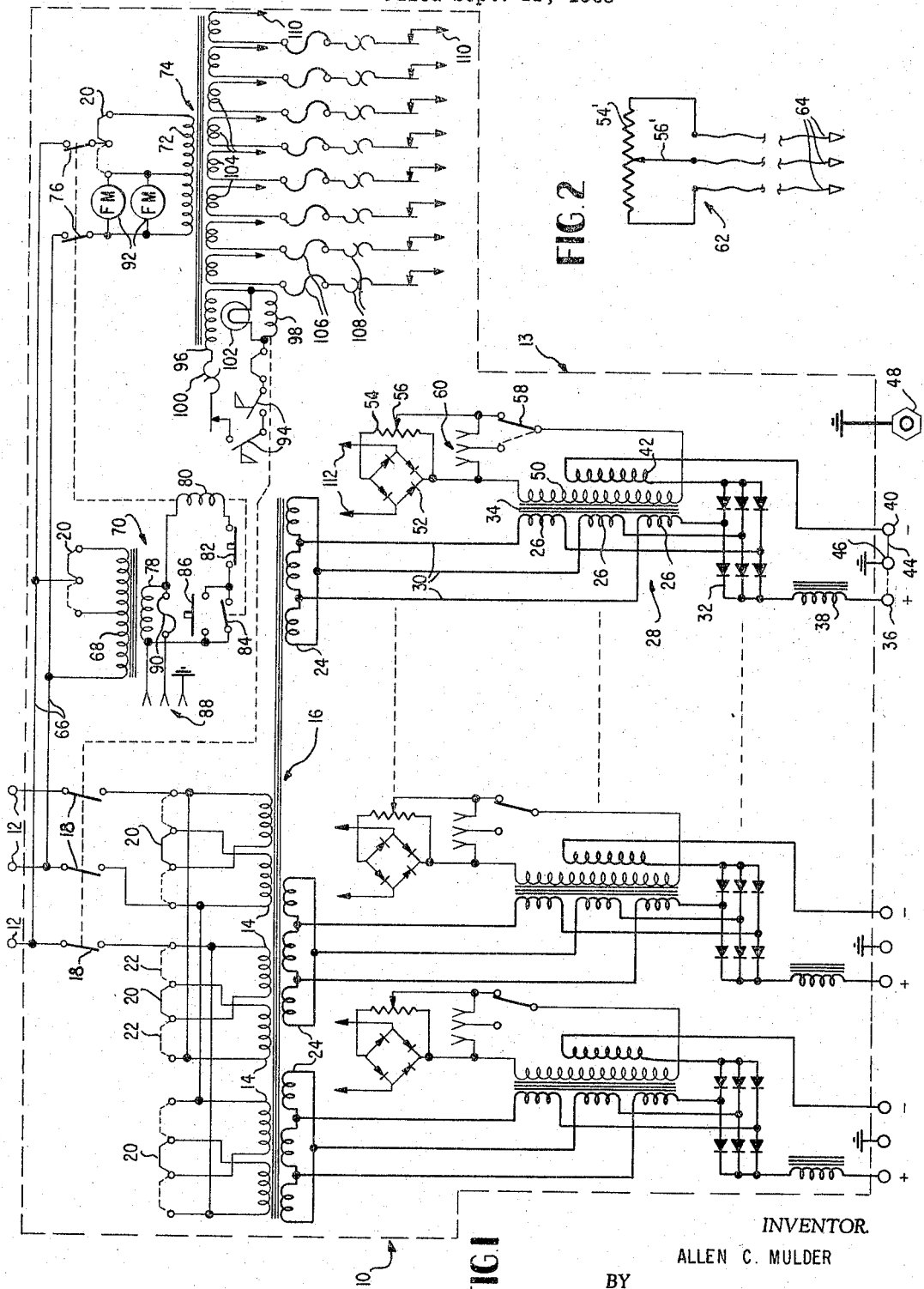

3,324,379
MULTIPLE UNIT WELDING APPARATUS
Allen C. Mulder, Appleton, Wis., assignor to Miller Electric Mfg. Co., Appleton, Wis.
Filed Sept. 11, 1963, Ser. No. 308,200
2 Claims. (Cl. 321—25)

This invention relates in general to a multiple unit welding apparatus, and more particularly to a novel power supply system for furnishing reactively controlled, rectified currents to a plurality of separate welding stations.

In the multiple unit welding systems of the prior art, it has been the practice to provide separate grid resistor banks for each welding station to effect individual current control. These grid resistor banks are really no more than power rheostats, and while they are satisfactory for certain applications, they possess several inherent disadvantages which render them totally unsuitable for a wide range of conditions normally encountered in most general welding situations. One of the primary disadvantages of such grid resistor banks is that they are the source of considerable power losses due to resistive heating effects, and these losses normally account for approximately two-thirds of the total power consumption in typical welding operations. In addition, grid resistor banks are susceptible to frequent failure due to their inability to withstand normal mechanical shocks or jarrings when hot, the oxidation of the grids resulting from moisture in the surrounding atmosphere, and overheating because of loose connections at junction blocks or distribution panels. Furthermore, since relatively high currents must be handled due to the inherent power losses in such banks, correspondingly larger electrical cables must be used throughout the system, thus offering even further disadvantages owing to the higher cost of the cables and the increased weights of same.

It is an object of this invention to provide a multiple unit welding apparatus which obviates the disadvantages of the prior art systems described above by employing reactive means to effect current control rather than resistive means.

It is a further object of this invention to provide a multiple unit welding apparatus which employs a plurality of separate saturable reactors to effect current control for each individual welding station, which reactors are not subject to the resistive heat losses attendant with the prior art systems.

It is a further object of this invention to provide such an apparatus in which the inputs to the reactors are derived from the separate secondary windings of a power transformer having a single primary winding, and in which the output from the reactors are applied to separate full wave rectifiers associated with each welding station.

It is a further object of this invention to provide such an apparatus in which each saturable reactor has a power winding, a control winding, and a feedback winding, and in which the regulating currents for the control windings are derived from the separate secondary windings of a control transformer having a single primary winding.

It is a further object of this invention to provide such an apparatus in which the output terminals for each welding station include a positive terminal, a negative terminal, and a ground terminal, whereby the polarity of the welding current at each station may be individually selected according to the needs of the operator.

The apparatus also advantageously includes forced draft cooling means for directing a continuous flow of air over the operative components of the apparatus by one or more motor driven fans. Each fan motor is equipped with a centrifugal switch so designed and connected into the circuit that the fan motor must be turning at proper speed before the power transformer can be energized. If multiple fans are used, all centrifugal switches are connected in series relation so that failure of any motor to operate properly will prevent the application of power to the main power transformer.

In addition, provision is made whereby the control winding current for each reactor may be adjusted either locally, at the apparatus itself, or remotely, at the site of a welding operation. Furthermore, the apparatus is designed so that all of its operative components may be assembled in a single, unitary structure, which may be conveniently housed within an easily transportable, weatherproof enclosure. This results in a number of advantages from a safety standpoint, since only the essential input and output terminals are exposed to operating personnel, and also facilitates the movement of the apparatus from one job site to another.

These and further objects may be more fully understood by referring to the following description of an illustrative embodiment of the invention taken in conjunction with the accompanying drawing, in which:

FIGURE 1 represents a schematic diagram of a multiple unit welding apparatus embodying the principles of the invention; and, FIGURE 2 represents a schematic diagram of a remote control unit adapted to be used with the apparatus of FIG. 1.

Referring now to FIGURE 1, the multiple unit welding apparatus designated by reference numeral 10 is fed from a three phase alternating current power source (not shown) connected to input terminals 12. It is to be understood that while a three phase system has been shown for convenience, the invention is equally applicable to any type of alternating current system with only minor changes in the transformer and reactor windings being necessary to effect such adaptation. The dotted line 13 represents the weatherproof enclosure in which the apparatus 10 is housed, and it will be noted that the only exposed electrical connections are the input and output terminals. The input terminals 12 are connected to the three phase primary windings 14 of a power transformer 16 through the relay controlled switches 18. It will be noted that the split primary windings 14 are provided with connecting clips 20 that permit them to be wired in series, as shown, or in parallel, as shown by the dotted line connections 22. This feature is merely to permit the user to adapt the apparatus for use with either 230 volt or 460 volt three phase alternating current supply systems, both of which are commonly available at most industrial locations. With the connecting clips 20 in the positions shown, the apparatus is adapted for use with a 460 volt supply system. The power transformer 16 is provided with a plurality of three phase secondary windings 24, only three being shown in the drawing. It is to be understood, however, that there will be a separate secondary winding for each welding station. Furthermore, since the circuitry associated with each secondary windinng is identical in every respect, only those components associated with one of the windings will be described herein in detail.

The separate phases of each secondary winding 24 are connected to the three power windings 26 of a saturable reactor 28 by means of lines 30, and the other ends of these power windings are connected to the input terminals of a three phase, full wave selenium rectifier 32. The details of the reactor construction will not be discussed per se, since such devices are well known to those skilled in the voltage regulation art. Suffice to state that the core 34 of the reactor is fabricated from some ferrous material having a gradually sloping hysteresis characteristic that levels off at a saturation peak well within the maximum current limitations of the reactor windings.

The direct current output from the rectifier 32 is connected to a positive welding station terminal 36 through a smoothing inductance 38, and to a negative terminal 40 through a reactor feedback winding 42. The inductance 38 is incorporated into the circuit to provide voltage and current stabilization of the welding arc, and tends to oppose any rapid changes in the output supplied to the welding station terminals. The feedback winding 42 supplies additional control current to the saturable reactor, as will be described later.

An important feature of the invention resides in the provision of both positive and negative output terminals for each welding station, thus permitting each operator to individually select whichever polarity he desires for the particular job requirement. This selection is accomplished by means of a short circuiting or grounding link 44, which may connect either the postive or the negative terminal to a common ground terminal 46, as desired. With such an arrangement different operators may simultaneously employ different welding polarities. There is no requirement that all of the outputs be of the same polarity since all of the units are effectively isolated from each other at the power transformer secondary. Furthermore, there is no requirement for a work or ground cable to be connected between each welding station ground terminal 46 and each workpiece, and all of the necessary ground cables may instead be connected to a central ground terminal 48. This substantially reduces the number of cables normally required, particularly in the case where a number of operators are all performing welding operations on the same structure, and frees the operator from the burden of carrying and manipulating an additional and cumbersome cable.

Each reactor 28 also includes a control winding 50 adapted to be energized with a direct current control signal derived from a full-wave bridge rectifier 52, which is in turn supplied from one of the secondary windings of a control transformer, as will be described later. A rheostat 54 is connected across the output terminals of the rectifier bridge 52, and its slidewire tap 56 is connected to the lower end of the control winding 50 through a manually operated switch 58. With such an arrangement the current flowing through the control winding 50 of the saturable reactor may effectively be adjusted by varying the position of the rheostat tap 56. In actual practice, this adjustment would normally be made by, or at the direction of, the operator in accordance with the strength of the welding arc he desires. It is to be understood that the manipulating controls for the rheostat taps (not shown) are conveniently located on the outside of the enclosure 13 to facilitate easy access.

The invention also contemplates that the control winding current may be remotely adjusted by the operator at the work site, and for this purpose the three plug sockets 60 are provided, connected as shown between the upper end of the control winding and the rheostat tap. Referring to FIGURE 2, there is schematically shown a remote control unit 62 having three connector prongs 64 adapted to be inserted into and engaged by the plug sockets 60. This unit parallels in both structure and functioning the local rheostat 54, and includes a rheostat winding 54' and a slidewire tap 56'. To use the remote control unit, the prongs 64 are inserted into the sockets 60 and the switch 58 is manually placed in the position shown by the dotted line. The rheostat tap 56 may then be set at the full voltage position at the top of the winding for a full range of remote current control, or at some intermediate position for a more limited control range.

Referring again to FIGURE 1, a single phase voltage is tapped from two of the input terminals 12 by lines 66 and fed to the primary winding 68 of an auxiliary transformer 70, and to the primary winding 72 of a control transformer 74 through the relay controlled switches 76. It will be noted that both of these transformer primaries are also equipped with connecting clips 20 to permit their use with either a 230 volt or a 460 volt three phase system, as described earlier. The secondary circuit of auxiliary transformer 70 serially includes a secondary winding 78, a relay coil 80, a manually operated stop switch 82, and a relay controlled switch 84. A manually operated start switch 86 is connected across the switch 84, and a single phase 115 volt outlet 88 for operating auxiliary equipment is taken directly from the secondary winding 78 through a protective fuse 90.

A power supply apparatus of this type must necessarily be provided with some form of cooling to dissipate the heat that builds up in the windings to thereby prolong the life of the insulation materials, and the invention advantageously employs a pair of forced draft fans driven by motors 92 for this purpose. These motors are connected across one-half of the control transformer primary winding 72, and are always energized when the relay controlled switches 76 are closed. A pair of centrifugally operated switches 94 are associated with the fan motors and are of the type that are open when the motors are at rest or turning below a proper minimum speed. These switches close when the fan motors come up to operating speed. The switches 94 are connected in series with each other in one of the secondary circuits of the control transformer 74, which circuit further includes a secondary winding 96, a relay coil 98, and a thermostatic switch 100. An indicator lamp 102 is connected across the relay coil 98.

The control transformer 74 further includes a plurality of secondary windings 104, there being one such winding for each welding station. The circuits of each of these windings serially include fuses 106 and thermostatic switches 108. Each secondary circuit is also provided with a pair of connectors 110 that are adapted to engage mating connectors 112. The connectors 112 are fitted onto the input lead wires for the rectifier bridges 52.

In operation, when the start switch 86 is momentarily depressed, the relay coil 80 becomes energized. This results in the closing of the relay controlled switches 76, thus energizing the control transformer primary winding 72, and also results in the closing of switch 84. This latter switch completes a holding circuit for relay coil 80 so that the relay will remain energized when the start switch 86 is released. With the control transformer primary winding energized, the fan motors 92 gradually build up speed, and when the motors have reached proper speed to provide sufficient air flow for cooling, the normally open centrifugal switches 94 are closed. When both of the centrifugal switches 94 are closed, the relay coil 98 and its associated indicator lamp 102 become energized through the control transformer secondary winding 96, thus closing the relay controlled switches 18 and allowing the full line voltage to be applied to the power transformer primary winding 14.

With the manually operated switch 58 in the position shown, welding current is now available at each of the welding station output terminals 36 and 40, the magnitude of which may be adjusted by varying the position of the slide wire tap 56 on the rheostat 54. By moving the tap toward the top of the rheostat winding, the amount of rectified current flowing through the control winding 50 is increased, thus increasing the saturation level of the reactor core 34. This in turn increases the reluctance of the reactor core, which weakens the alternating magnetic field set up therein by the alternating current flowing through the power windings 26. Accordingly, the bucking voltage induced back into the power windings 26 is decreased, and the magnitude of the welding current available at terminals 36 and 40 is increased. This effect is heightened in a cumulative manner by the feedback winding 42. As the welding current increases, the current flowing through the feedback winding correspondingly increases, thus further saturating the reactor core and resulting in an even greater increase in the magnitude of the welding current. In a similar manner, by moving the tap 56 in the opposite direction the control winding current is decreased, the reactor core saturation level is decreased, and the magnitude of the welding current is correspondingly decreased. If any one or more of the welding operators desires to control the magnitude of the welding current remotely, such as at the welding site, it is only necessary that a remote control unit 62 be inserted into the proper plug sockets 60 and the switch 58 be manually placed in the alternate position shown by the dotted line. Current control may now be effected by varying the position of the slidewire tap 56' on the rheostat 54'.

In addition, each operator may independently select the polarity of his welding current by connecting the grounding link 44 between the proper terminals, although this selection must be made before the apparatus is energized due to safety considerations. It is also necessary that each work piece be grounded by a suitable cable connection between the work piece and the central ground terminal 48, although only a single grounding cable may be required when all of the welding operators are working on the same physical structure.

The fuses 106 are provided to protect the secondary circuits of the control transformer, including the rectifier bridges 52 and the rheostats 54, from damaging surge currents due to short circuits or line faults. In a similar manner, the thermostatic switches 108 serve to protect the circuits from excessive local temperature conditions, such as might be caused by impeded air flow through the apparatus or by an overload of current or duty cycle. It is to be understood that the control transformer secondary winding connectors 110 are normally engaged with their corresponding mating connectors 112, and these circuits have been shown as being disconnected only for reasons of space economy.

In order to de-energize the apparatus, it is only necessary to momentarily depress the stop switch 82. This results in the de-energization of relay coil 80 and the consequent opening of switches 76 and 84. The opening of switch 84 interrupts the holding circuit for relay coil 80 and insures that the coil will not become re-energized upon the release of the stop switch. The opening of switches 76 interrupts the primary winding circuit of the control transformer 74. This in turn causes the relay coil 98 and its associated indicator lamp 102 to become de-energized which results in the opening of the line switches 18 in the primary circuit of the power transformer 16. At the same time the fan motors 92 are de-energized, and when the motor speed has decreased below the minimum necessary to hold switches 94 closed, the centrifugal switches 94 open. The apparatus is now completely de-energized and is ready for subsequent operation upon the momentary depression of the start switch 86.

It can be seen that applicant has disclosed a novel multiple unit welding apparatus in which individually controllable saturable reactive means have been employed to facilitate either local or remote control of the welding currents by each operator. In addition, means have been provided whereby the current polarity at each welding station may be independently selected by each operator, and the forced draft cooling means employed has associated therewith centrifugally operative safety switches for preventing damage to the apparatus in the event of a cooling means failure. Furthermore, each welding station is supplied through individual secondary windings of a single power transformer, thereby providing complete electrical isolation of each welding circuit. The entire apparatus is embodied in a unitary structural assembly, and is conveniently housed within a weatherproof enclosure.

While the invention has been particularly shown and described with reference to a single preferred embodiment thereof, it will be understood by those skilled in the art that various modifications and changes may be made therein without departing from the spirit and scope of the invention.

I claim:
1. A multiple unit welding apparatus for supplying separately controlled DC currents to a plurality of individual welding stations, comprising:
   (a) a power transformer having a single primary winding, and a plurality of individual secondary windings,
   (b) a control transformer having a single primary winding and a plurality of individual secondary windings,
   (c) a motor driven fan unit connected across the primary winding of the control transformer for directing a flow of cooling air across the apparatus,
   (d) a start-stop circuit for controlling the energization of the primary winding of the control transformer from an AC source,
   (e) centrifugally operated switch means responsive to the fan motor speed connected in series with a relay coil across one of the secondary windings of the control transformer,
   (f) relay switch means operated by the relay coil for connecting the primary winding of the power transformer to an AC source, whereby the energization of the control transformer by the start-stop circuit energizes the fan unit which closes the centrifugally operated switch means when the fan motor reaches a sufficient cooling speed, which in turn energizes the relay coil to close the relay switch means and energize the power transformer,
   (g) a plurality of welding station output terminal means,
   (h) a plurality of first rectifier means individually connected to respective ones of the output terminal means,
   (i) a plurality of saturable reactive means each having a power winding, a control winding, and a feedback winding, each power winding being individually connected between respective ones of the power transformer secondary windings and respective ones of the first rectifier means, and each feedback winding being connected between respective ones of the first rectifier means and respective ones of the output terminal means,
   (j) a plurality of second rectifier means individually connected to respective ones of the control transformer secondary windings, and
   (k) a plurality of variable current control means individually connected between respective ones of the second rectifier means and respective ones of the control windings, whereby the rectified current supplied to each output terminal means may be separately varied by adjusting the associated current control means.
2. A multiple unit welding apparatus as defined in claim 1 wherein each welding station output terminal means includes a positive terminal, a negative terminal, a common ground terminal, and means for short circuiting either the positive terminal or the negative terminal to the ground terminal, whereby the polarity of the welding current may be selected at each output terminal means according to the needs of the operator.

References Cited
UNITED STATES PATENTS

| | | | |
|---|---|---|---|
| 2,928,926 | 3/1960 | Winz | 307—31 |
| 2,994,027 | 7/1961 | Bennett et al. | 321—25 |
| 3,058,047 | 10/1962 | Tajbl | 321—25 |
| 3,059,164 | 10/1962 | Johnson. | |

FOREIGN PATENTS 492,930   9/1938   Great Britain.

JOHN F. COUCH, *Primary Examiner.*

M. L. WACHTELL, *Assistant Examiner.*